(12) United States Patent
Mankame et al.

(10) Patent No.: US 8,998,320 B2
(45) Date of Patent: Apr. 7, 2015

(54) USING RESTING LOAD TO AUGMENT ACTIVE MATERIAL ACTUATOR DEMAND IN POWER SEATS

(75) Inventors: Nilesh D. Mankame, Ann Arbor, MI (US); Jennifer P. Lawall, Waterford, MI (US); Richard J. Skurkis, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 236 days.

(21) Appl. No.: 13/535,371

(22) Filed: Jun. 28, 2012

(65) Prior Publication Data

US 2012/0267928 A1 Oct. 25, 2012

(51) Int. Cl.
*B60N 2/62* (2006.01)
*B60N 2/00* (2006.01)
*B60N 2/02* (2006.01)
*B60N 2/44* (2006.01)
*B60N 2/66* (2006.01)

(52) U.S. Cl.
CPC .............. *B60N 2/002* (2013.01); *B60N 2/0244* (2013.01); *B60N 2/0284* (2013.01); *B60N 2/449* (2013.01); *B60N 2/66* (2013.01)

(58) Field of Classification Search
USPC ................... 297/284.2, 284.4, 284.9, 284.11, 297/354.12, 361.1
See application file for complete search history.

(56) References Cited

U.S. PATENT DOCUMENTS

| 6,578,916 | B2 * | 6/2003 | Longhi et al. | 297/284.3 |
|---|---|---|---|---|
| 7,448,678 | B2 * | 11/2008 | Browne et al. | 297/216.12 |
| 7,758,121 | B2 * | 7/2010 | Browne et al. | 297/284.11 |
| 7,905,547 | B2 * | 3/2011 | Lawall et al. | 297/284.4 |
| 7,909,403 | B2 * | 3/2011 | Lawall et al. | 297/284.9 |
| 8,109,567 | B2 * | 2/2012 | Alexander et al. | 297/216.12 |
| 2008/0129098 | A1 * | 6/2008 | Kennedy et al. | 297/354.1 |
| 2009/0224584 | A1 * | 9/2009 | Lawall et al. | 297/311 |
| 2010/0033002 | A1 * | 2/2010 | Di Giusto et al. | 297/284.2 |

FOREIGN PATENT DOCUMENTS

| DE | 10211383 | 10/2003 |
|---|---|---|
| DE | 102007017809 | 11/2007 |
| DE | 102009041521 | 5/2010 |
| DE | 112009000495 | 2/2011 |
| DE | 112009000575 | 2/2011 |
| DE | 112009000484 | 3/2011 |
| DE | 112009001359 | 4/2011 |
| DE | 102012203507 | 10/2012 |
| WO | WO 2007/065646 | 6/2007 |

* cited by examiner

*Primary Examiner* — Peter Brown (57) ABSTRACT

A power seat adjustment assembly comprising an active material actuator, adapted for use when a resting load is present within the seat, and configured to reduce actuator demand, and therefore actuator size and/or rating, by modifying the load to augment performance.

11 Claims, 5 Drawing Sheets

USING RESTING LOAD TO AUGMENT ACTIVE MATERIAL ACTUATOR DEMAND IN POWER SEATS

RELATED APPLICATIONS

This patent application is related to U.S. Non-provisional patent application Ser. No. 12/392,080, entitled "ACTIVE MATERIAL ACTUATED SEAT BASE EXTENDER," filed on Feb. 24, 2009, the disclosure of which is incorporated herein by reference.

BACKGROUND OF THE INVENTION

1. Field of the Invention

The present disclosure generally relates to power adjusted seat features, and more particularly, to power adjusted seat features having an adjustable structure and transmission cooperatively driven by a resting load, such as the weight of an occupant, and an actuator, so as to reduce actuator demand.

2. Discussion of Prior Art

Power adjusted seat features, such as manipulable base length, positioning, and tilt, bolster orientation, upright angles of inclination, and lumbar support tensioning and position are conventionally provided to support and comfort occupants presenting differing dimensions, and preferences. These features typically employ actuators (e.g., electro-mechanical motors, solenoids, etc.) that are selected and/or sized to translate the maximum anticipated load, irrespective of the presence of a resting load applied to the seat component. It has long been appreciated that the addition of such actuators adds to the complexity, weight, and cost of the seat. In an aircraft or vehicular setting, for example, this concern further results in a reduction in fuel efficiency, as well as an increase in energy consumption during adjustment.

BRIEF SUMMARY OF THE INVENTION

The present invention provides an assembly for and method of reducing actuator demand in power adjusted seats by using the resting load upon the seat to augment the actuation force necessary to adjust the seat component. As a result, the invention is useful for enabling the use of lower rated or smaller actuators in comparison to prior art equivalents. More particularly, the invention is useful for leveraging occupant-exerted loads to reduce the force and/or displacement requirements on the actuators used to provide additional power-operated features in seats. The invention is therefore useful for presenting an energy efficient seat adjustment solution that better accommodates a plurality of differing (e.g., in size and/or preference) occupants. Finally, where active material actuation is employed in lieu of electro-mechanical motors, solenoids, etc., the invention is useful, among other things, for reducing weight, packaging requirements, and noise (both acoustically and with respect to EMF), as well as the power/energy requirements on the actuator thereby expanding their use.

In general, the inventive assembly comprises a reconfigurable seat structure shiftable between first and second permanent dimensions, orientations, positions, or conditions. The assembly further includes an actuator drivenly coupled to the structure, and a mechanical transmission also coupled to the structure. The transmission is operable to receive and modify at least a portion of a resting load within the seat. The actuator and transmission are cooperatively configured to cause the structure to shift between the first and second permanent dimensions, orientations, positions, or conditions, when the resting load is present and the actuator is activated.

This disclosure, including exemplary embodiments, and applications of the assembly, with particular respect to the seat base and seat bolsters, may be understood more readily by reference to the following detailed description of the various features of the disclosure and drawing figures associated therewith.

BRIEF DESCRIPTION OF THE SEVERAL VIEWS OF THE DRAWING

A preferred embodiment(s) of the invention is described in detail below with reference to the attached drawing figures of exemplary scale, wherein.

DETAILED DESCRIPTION OF THE INVENTION

Figure 1:
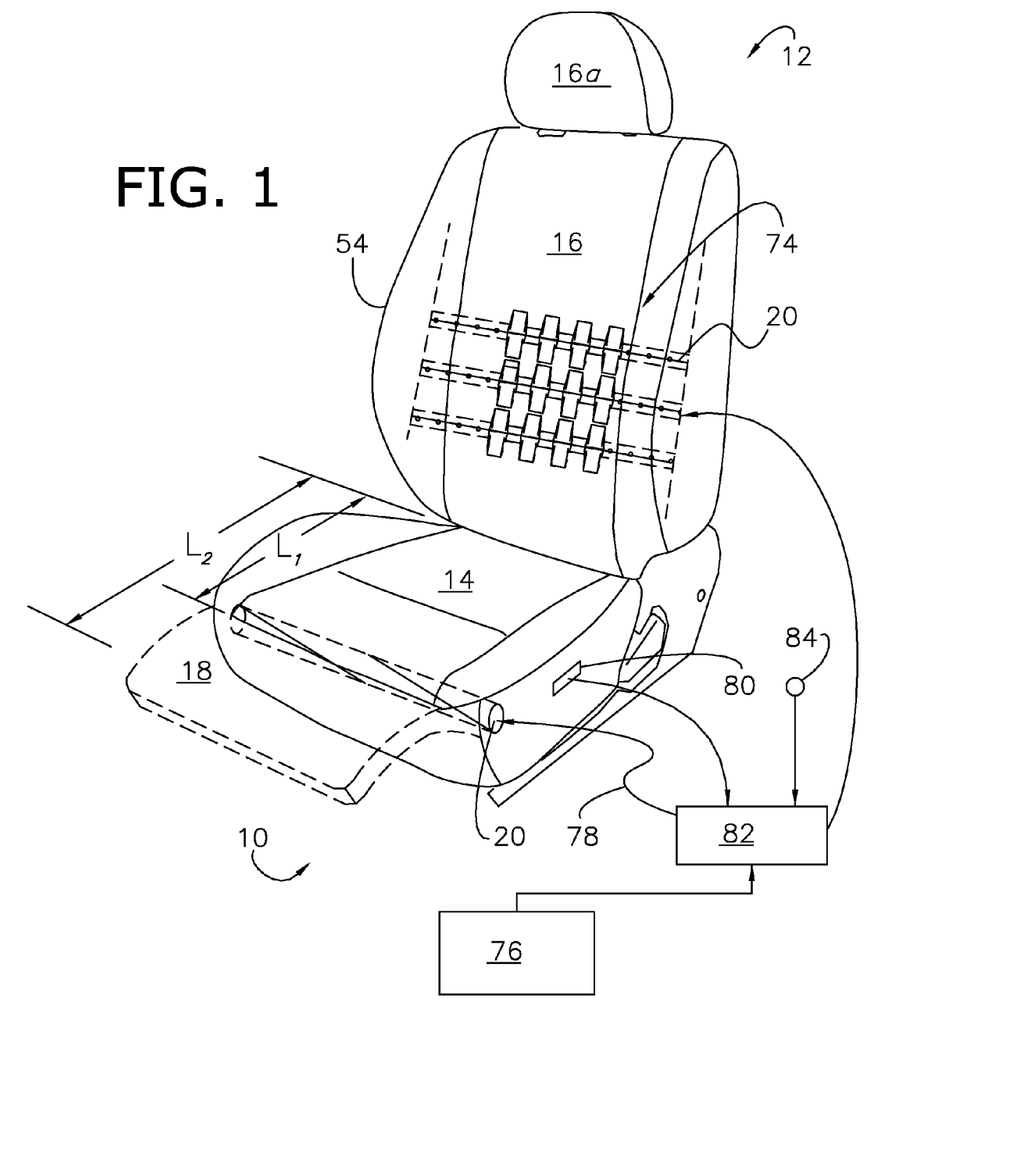
FIG. 1 is a perspective view of an automotive seat having a base and an upright, and particularly illustrating a base extension system including a pivotal structure, and adjustable lumbar supports communicatively coupled to a controller, signal source, input device, and sensor, in accordance with a preferred embodiment of the invention.

The following description of the preferred embodiments of a power adjusted seat assembly 10 for and methods of using a resting load 100, such as the weight of an occupant, to augment actuator performance (i.e. reduce actuator load), is exemplary in nature and in no way intended to limit the invention, its application, or uses. The inventive assembly 10 is described and illustrated as composing an automotive seat 12 including a base 14 configured to support the posterior of an occupant (not shown), an upright 16 configured to support the back of the occupant, and a headrest 16a (FIG. 1). It is well appreciated, however, that the benefits of the present invention may be utilized variously with other types of seats (or furniture), including, for example, power adjusted reclining sofas, airplane seats, bar stools, etc. As shown in the illustrated embodiments, the inventive assembly 10 is configured to augment a conventional power adjusted seat feature, such as the upright angle of inclination, upright lumbar tensioning, base fore-aft position, base altitude, base length, base ramp angle or tilt, lateral base or upright bolster configurations, and/or headrest positioning.

The inventive power adjusted seat assembly 10 includes a reconfigurable seat structure 18 shiftable between first and second permanent dimensions, orientations, positions, or conditions (collectively referred to hereafter as "first and second configurations" though not limited thereto), to achieve, for example, deployed and stowed conditions. That is to say, the structure 18 is retained within, or otherwise able to maintain both the first and second configurations without external force being applied. The structure 18 may be a seat base structure composing, for example, a fore-aft adjustment system, base extension system, or an adjustable base pan, ramp, or mount. The structure 18 may be an upright structure, such as an upright frame pivotal about an axis to produce the angle of inclination, or a lumbar support member disposed within the upright and adjustably tensioned to variably support an occupant. Finally, the structure 18 may compose a manipulable headrest 16a communicatively coupled to the load experienced by the upright 16.

In a preferred embodiment, the assembly 10 includes an actuator 20 drivenly coupled to the structure 18, and a mechanical transmission or link 22 also drivenly coupled to the structure 18 and acting in concert with the actuator 20. The actuator 20 is sized and/or rated to produce the force necessary to effect the intended function of the invention as augmented by the transmission 22, and may include an electromechanical motor, solenoid, etc.; however, it is appreciated that the present invention is particularly suited for use with an active material actuator 20. The actuator 20 may be directly or indirectly driven to the structure 18 in such a manner as to present a primary or secondary actuator. That is to say, the active material actuator 20 may present a secondary actuator that reduces the resistance to change in position of the structure 18 in one direction, e.g. by releasing a latch, changing the linkage geometry, introducing a bias in the deformation of a flexible member that causes it to choose a lower energy bending mode instead of a higher energy compression mode, etc. Once the resistance to change in positions is reduced, the resting load produces a change in position either by itself or in conjunction with a primary actuator or energy storage component (e.g., spring). The primary actuator may be used to a) augment the resting load in producing motion in one direction, and/or b) produce motion in the opposite i.e. upward direction. Where the primary actuator is replaced by an energy storage component, the active material actuator reduces resistance to change in position in both directions.

I. Active Material Description and Functionality

As used herein the term "active material" shall be afforded its ordinary meaning as understood by those of ordinary skill in the art, and includes any material or composite that exhibits a reversible change in a fundamental (e.g., chemical or intrinsic physical) property, when exposed to an external signal source. Thus, active materials shall include those compositions that can exhibit a change in stiffness properties, shape and/or dimensions in response to an activation signal.

Active materials suitable for use herein, include, without limitation, shape memory alloys (SMA), ferromagnetic shape memory alloys, electroactive polymers (EAP), piezoelectric materials, high-output-paraffin (HOP) wax actuators, and the like. Depending on the particular active material, the activation signal can take the form of, without limitation, heat energy, an electric current, an electric field (voltage), a temperature change, a magnetic field, a mechanical loading or stressing, and the like, with the particular activation signal dependent on the materials and/or configuration of the active material. For example, a magnetic field may be applied for changing the property of the active material fabricated from magneto strictive materials. A heat signal may be applied for changing the property of thermally activated active materials such as SMA. An electrical signal may be applied for changing the property of the active material fabricated from electroactive materials and piezoelectrics (PZT's).

More particularly, shape memory alloys (SMA's) generally refer to a group of metallic materials that demonstrate the ability to return to some previously defined shape or size when subjected to an appropriate thermal stimulus. Shape memory alloys are capable of undergoing phase transitions in which their yield strength, stiffness, dimension and/or shape are altered as a function of temperature. The term "yield strength" refers to the stress at which a material exhibits a specified deviation from proportionality of stress and strain. Generally, in the low temperature, or martensite phase, shape memory alloys can be pseudo-plastically deformed and upon exposure to some higher temperature will transform to an austenite phase, or parent phase, returning to their shape prior to the deformation.

Thus, shape memory alloys exist in several different temperature-dependent phases. The most commonly utilized of these phases are the so-called martensite and austenite phases discussed above. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$).

When the shape memory alloy is in the austenite phase and is cooled, it begins to change into the martensite phase, and the temperature at which this phenomenon starts is referred to as the martensite start temperature ($M_s$). The temperature at which austenite finishes transforming to martensite is called the martensite finish temperature ($M_f$). Generally, the shape memory alloys are softer and more easily deformable in their martensitic phase and are harder, stiffer, and/or more rigid in the austenitic phase. In view of the foregoing, a suitable activation signal for use with shape memory alloys is a thermal activation signal having a magnitude to cause transformations between the martensite and austenite phases.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Active materials comprising shape memory alloy compositions that exhibit one-way memory effects do not automatically reform, and will likely require an external mechanical force to reform the shape that was previously presented.

Intrinsic and extrinsic two-way shape memory materials are characterized by a shape transition both upon heating from the martensite phase to the austenite phase, as well as an additional shape transition upon cooling from the austenite phase back to the martensite phase. Active materials that exhibit an intrinsic shape memory effect are fabricated from a shape memory alloy composition that will cause the active materials to automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification, such as laser annealing, polishing, or shot-peening. Once the material has been trained to exhibit the two-way shape memory effect, the shape change between the low and high temperature states is generally reversible and persists through a high number of thermal cycles. In contrast, active materials that exhibit the extrinsic two-way shape memory effects are composite or multi-component materials that combine a shape memory alloy composition that exhibits a one-way effect with another element that provides a restoring force to reform the original shape.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the system with shape memory effects, super-elastic effects, and high damping capacity.

Suitable shape memory alloy materials include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape orientation, damping capacity, and the like.

It is appreciated that SMA's exhibit a modulus increase of 2.5 times and a dimensional change of up to 8% (depending on the amount of pre-strain) when heated above their Martensite to Austenite phase transition temperature. It is appreciated that thermally induced SMA phase changes are typically one-way so that a biasing force return mechanism (such as a spring) would be required to return the SMA to its starting configuration once the applied field is removed. Joule heating can be used to make the entire system electronically controllable.

Ferromagnetic Shape Memory Alloys (FSMA) are a subclass of SMA. FSMA can behave like conventional SMA materials that have a stress or thermally induced phase transformation between martensite and austenite. Additionally FSMA are ferromagnetic and have strong magneto-crystalline anisotropy, which permit an external magnetic field to influence the orientation/fraction of field aligned martensitic variants. When the magnetic field is removed, the material exhibits partial two-way or one-way shape memory. For partial or one-way shape memory, an external stimulus, temperature, magnetic field or stress may permit the material to return to its starting state. Perfect two-way shape memory may be used for proportional control with continuous power supplied. One-way shape memory is most useful for latching-type applications where a delayed return stimulus permits a latching function. External magnetic fields are generally produced via soft-magnetic core electromagnets in automotive applications. Electric current running through the coil induces a magnetic field through the FSMA material, causing a change in shape. Alternatively, a pair of Helmholtz coils may also be used for fast response.

Exemplary ferromagnetic shape memory alloys are nickel-manganese-gallium based alloys, iron-platinum based alloys, iron-palladium based alloys, cobalt-nickel-aluminum based alloys, cobalt-nickel-gallium based alloys Like SMA these alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range and the type of response in the intended application.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that it has a maximum elastic modulus of about 100 MPa. In another embodiment, the polymer is selected such that it has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thickness suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

Suitable piezoelectric materials include, but are not intended to be limited to, inorganic compounds, organic compounds, and metals. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metals selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Finally, it is appreciated that piezoelectric ceramics can also be employed to produce force or deformation when an electrical charge is applied. PZT ceramics consists of ferroelectric and quartz material that are cut, ground, polished, and otherwise shaped to the desired configuration and tolerance. Ferroelectric materials include barium titanate, bismuth titanate, lead magnesium niobate, lead metaniobate, lead nickel niobate, lead zinc titanates (PZT), lead-lanthanum zirconate titanate (PLZT) and niobium-lead zirconate titanate (PNZT). Electrodes are applied by sputtering or screen printing processes, and then the block is put through a poling process where it takes on macroscopic piezoelectric properties. Multi-layer piezo-actuators typically require a foil casting process that allows layer thickness down to 20 μm. Here, the electrodes are screen printed and the sheets laminated; a compacting process increases the density of the green ceramics and removes air trapped between the layers. Final steps include a binder burnout, sintering (co-firing) at temperatures below 1100° C., wire lead termination, and poling.

Barium titanates and bismuth titanates are common types of piezoelectric ceramics Modified barium-titanate compositions combine high-voltage sensitivity with temperatures in the range of −10° C. to 60° C. Barium titanate piezoelectric ceramics are useful for hydrophones and other receiving devices. These piezoelectric ceramics are also used in low-power projectors. Bismuth titanates are used in high temperature applications, such as pressure sensors and accelerometers. Bismuth titanate belongs to the group of sillenite structure-based ceramics ($Bi_{12}MO_2O$ where M=Si, Ge, Ti).

Lead magnesium niobates, lead metaniobate, and lead nickel niobate materials are used in some piezoelectric ceramics. Lead magnesium niobate exhibits an electrostrictive or relaxor behavior where strain varies non-linearly. These piezoelectric ceramics are used in hydrophones, actuators, receivers, projectors, sonar transducers, and in micropositioning devices because they exhibit properties not usually present in other types of piezoelectric ceramics. Lead magnesium niobate also has negligible aging, a wide range of operating temperatures and a low dielectric constant Like lead magnesium niobate, lead nickel niobate may exhibit electrostrictive or relaxor behaviors where strain varies non-linearly.

Piezoelectric ceramics include PZN, PLZT, and PNZT. PZN ceramic materials are zinc-modified, lead niobate compositions that exhibit electrostrictive or relaxor behavior when non-linear strain occurs. The relaxor piezoelectric ceramic materials exhibit a high-dielectric constant over a range of temperatures during the transition from the ferroelectric phase to the paraelectric phase. PLZT piezoelectric ceramics were developed for moderate power applications, but can also be used in ultrasonic applications. PLZT materials are formed by adding lanthanum ions to a PZT composition. PNZT ceramic materials are formed by adding niobium ions to a PZT composition. PNZT ceramic materials are applied in high-sensitivity applications such as hydrophones, sounders and loudspeakers.

Piezoelectric ceramics include quartz, which is available in mined-mineral form and man-made fused quartz forms. Fused quartz is a high-purity, crystalline form of silica used in specialized applications such as semiconductor wafer boats, furnace tubes, bell jars or quartzware, silicon melt crucibles, high-performance materials, and high-temperature products. Piezoelectric ceramics such as single-crystal quartz are also available.

II. Exemplary Assemblies, Methods, and Applications

Figures 2, 2A:
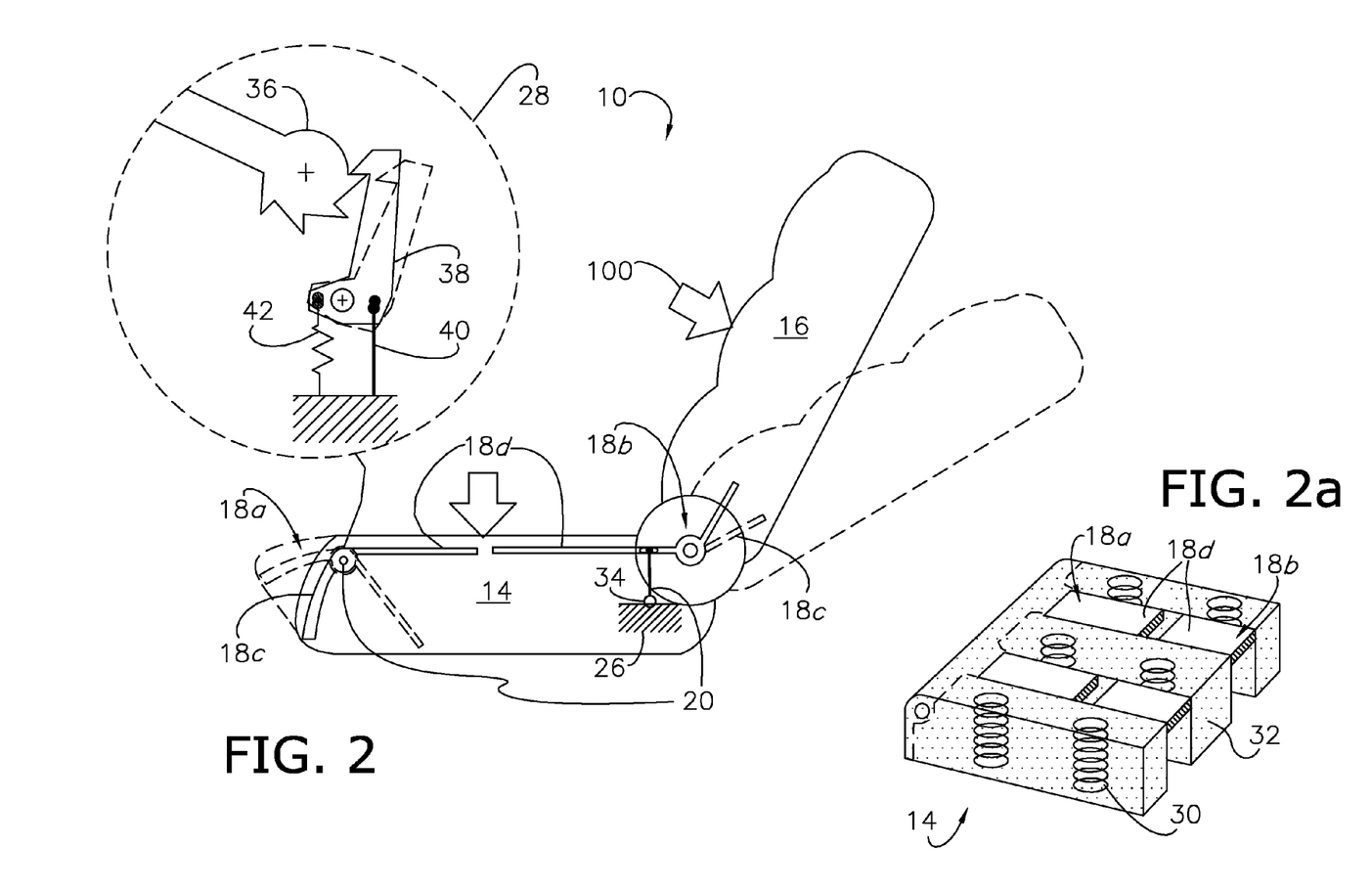
FIG. 2 is a side elevation of an automotive seat under a resting load, showing internally base extension and upright inclination adjustment systems, including pivotal structures, shape memory wire and torque tube actuators respectively, and in enlarged caption view a toothed gear locking mechanism, in accordance with a preferred embodiment of the invention.
FIG. 2a is a partial perspective view of the seat shown in FIG. 2, particularly illustrating the extended portion of the pivot structure disposed within the base cushioning, and concentrically aligned with the extender pivot axis, in accordance with a preferred embodiment of the invention.
Figure 4A:
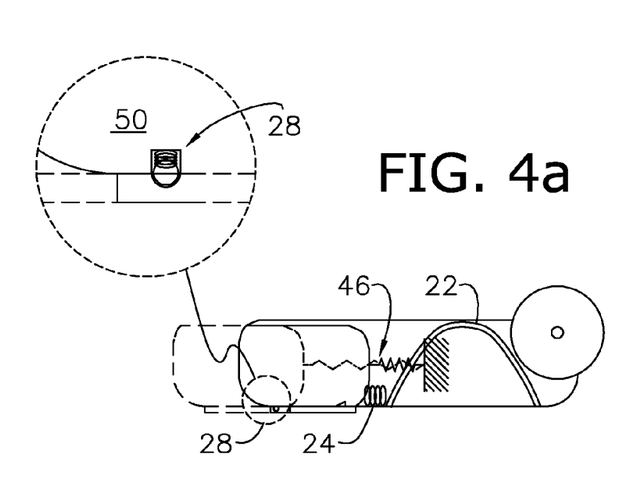
FIG. 4a is a partial elevation of a base extension assembly including a fixed section, adjustable free section, flexible rib transmission, and in enlarged caption view a detent locking mechanism, in accordance with a preferred embodiment of the invention.
Figure 4B:
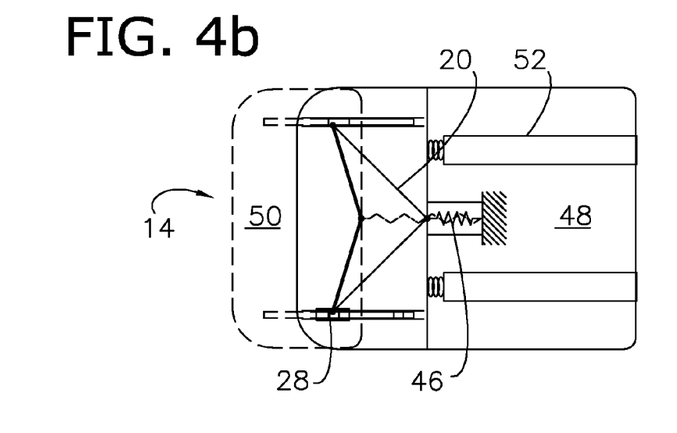
FIG. 4b is a top view of the system shown in FIG. 4a, further illustrating a bow-string shape memory wire actuator, and the transmission, in accordance with a preferred embodiment of the invention.
Figure 5:
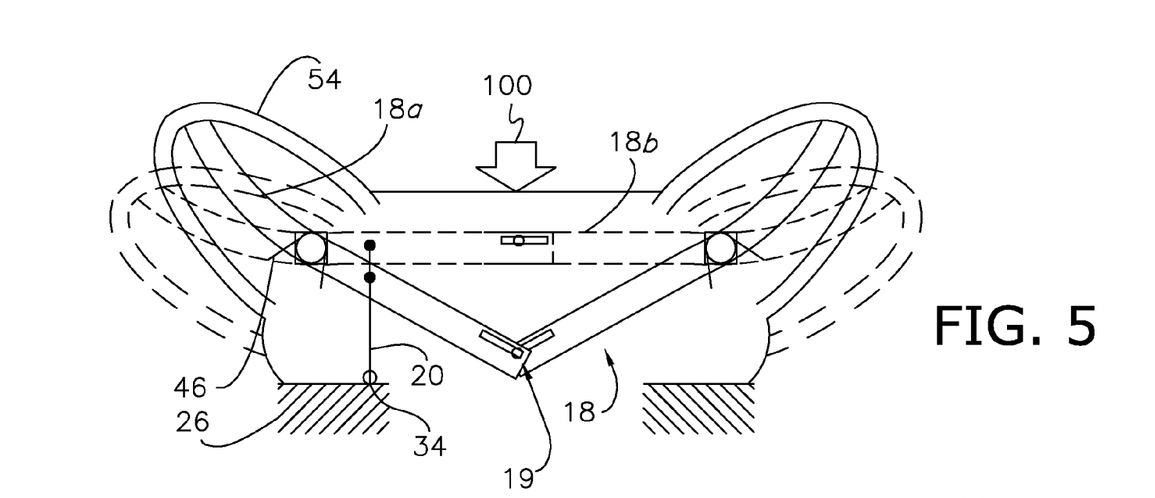
FIG. 5 is an elevation of an adjustable bolster including an arcuate shaped structure, and a vertically oriented wire actuator, shown in flattened (hidden-line type) and raised (solid line-type) conditions as a result of activation and augmentation by the resting load, in accordance with a preferred embodiment of the invention.
Figure 6:
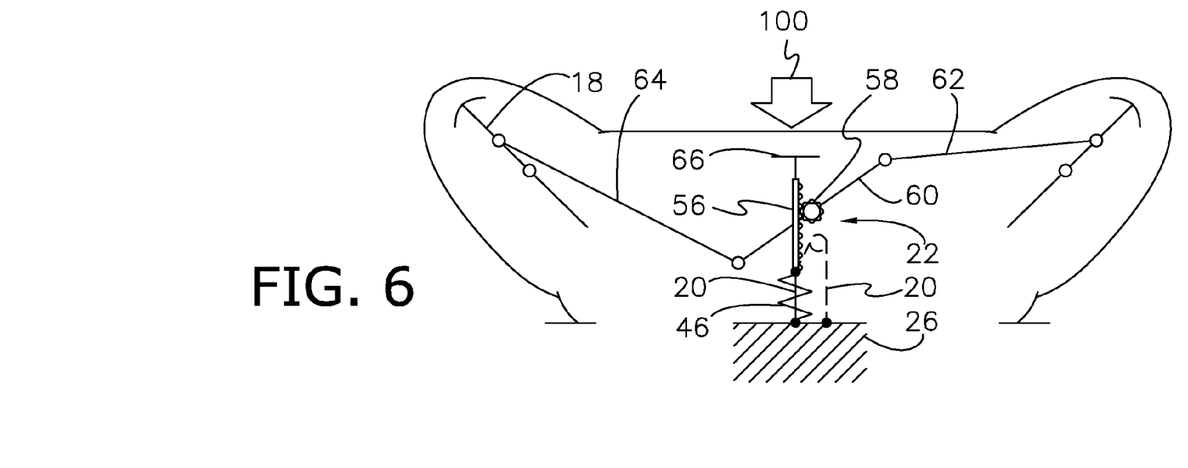
FIG. 6 is a front elevation of an adjustable bolster system including a rack and pinion, and a linkage transmission interconnecting first and second pivotal structures, and an SMA wire actuator augmented by a resting load and drivenly coupled to the transmission, in accordance with a preferred embodiment of the invention.
Figure 7A:
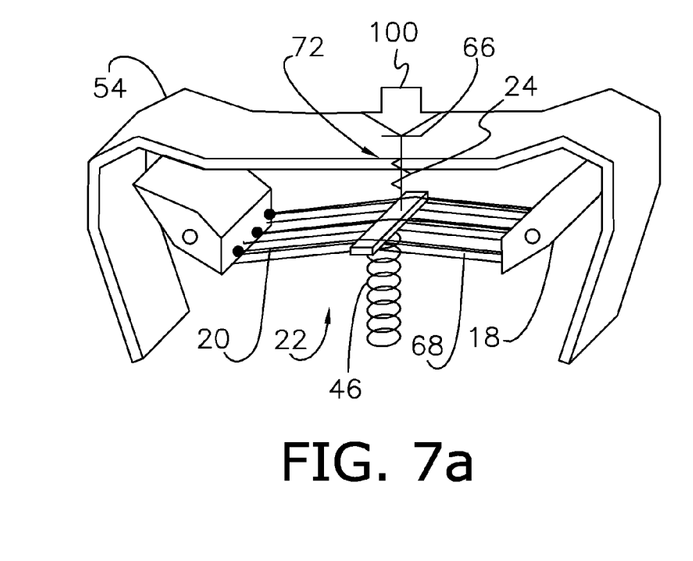
FIG. 7a is a perspective view of a seat section under a resting load, and more particularly, first and second adjustable lateral bolsters including an active material based actuator and transmission employing a folding mechanism and platform shown in a flattened and deactivated condition, in accordance with a preferred embodiment of the invention.
Figure 7B:
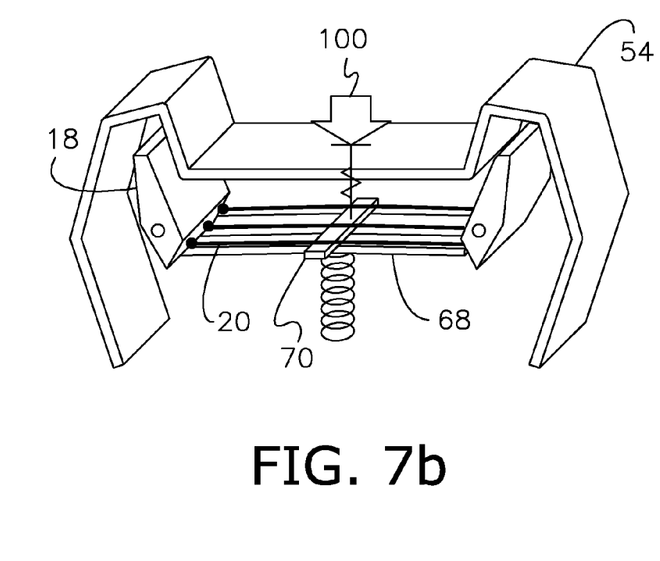
FIG. 7b is a perspective view of the bolsters shown in FIG. 7a, wherein the assembly is in a raised condition caused by activation.

Returning to the structural configuration of the present invention, the transmission 22 is operable to receive at least a portion of the load 100, and may present a singular construct such as a lever arm, or a multi-part mechanism, such as a rack and pinion. The actuator 20 and transmission 22 are cooperatively configured to cause the structure 18 to shift between the first and second configurations, when the resting load 100 is present and the actuator 20 is activated. The inventive transmission 22 modifies the force vector presented by the load 100 to effect the targeted motion of the structure 18 and augment the actuation force provided by the actuator 20. For example, where the structure 18 defines a pivot axis, the transmission 22 may be configured to convert the linear load 100 into a useful moment about the axis (FIGS. 2, 5, and 6). In other examples, the transmission 22 may be configured to redirect the force vector, and/or modify the magnitude of the vector, so as to provide mechanical advantage (FIGS. 2 and 5). The transmission 22 may be intermediate the structure 18 and actuator 20, so as to be driven by both the load 100 and actuator 20 (FIGS. 3, and 5-7); alternatively, the transmission 22 and actuator 20 may be separately coupled to the structure 18 (FIGS. 4*a,b*). Finally, the transmission 22 may include a stored energy element 24 drivenly coupled to the structure 18, and operable to release stored energy when the actuator 20 is activated and the structure 18 is free to shift, so as to augment actuator performance. That is to say, in a preferred embodiment, the transmission 22 is configured to store energy generated by the load 100 until needed (FIGS. 4 and 7).

Whereas the structure 18 or a peripheral component thereto (e.g., latch) presents a resistance to shifting between different configurations, the load 100 and actuator 20, in a first aspect of the invention, may be cooperatively configured to overcome the resistance. In a second aspect, the load 100 and actuator 20 may be individually able to overcome the resistance, but cooperatively configured to achieve the final stroke. That is to say, the load 100 (upon release of the structure 18 by the secondary actuator) may be operable to drive the structure 18 to a first intermediate configuration, so that a primary actuator 20 of lesser stroke may be used to drive the structure 18 from the intermediate configuration to the second configuration.

In a first embodiment of the invention, FIGS. 1 and 2 show an extendable seat base 14 in a normal state, wherein a first support length, $L_1$, is defined. At least a portion of the base 14 is drivenly coupled to or otherwise associated with at least one active material actuator 20, so as to be reconfigurable thereby. Here, shifting between two different configurations causes the support length to extend (or retract) to a second length, $L_2$. More particularly, the base 14 includes a moveable structure 18*a* that is pivotally connected to the base frame 26, so as to define a pivot axis. In this configuration, the preferred actuator 20 is essentially a torque tube, and more preferably an SMA driven torque tube, so as to facilitate the intended function of the invention. The structure 18*a* presents an angled flap co-extending with the base 14 and defining short and extended panels 18*c,d* (FIGS. 2 and 2*a*). As illustrated, the actuator 20 is configured to rotate the extended panel 18*d* downward, such that the short panel 18*c* is caused to swing outward and establish the second length.

To augment actuator performance in this configuration, the extended panel 18*d* is configured to receive a resting load 100 upon the seat base 14, and convert at least a portion of the load 100 into torque at the pivot axis, wherein the torque is stored as potential energy via a locking mechanism 28 (FIG. 2). When base extension is desired, the locking mechanism 28 is released, so that the torque produced by the load 100 aids the actuator 20 in pivoting the short panel 18*c*. That is to say, the torque tube 20 is concentrically aligned with the pivot axis, and presents suitable ratcheting action and resistive rotation, so that the entirety of the axis is locked under the load 100, but allowed to rotate and reestablish its basis when released. An internal drum (not shown) drivenly coupled to the short panel 18*c* is caused to further rotate as a result of activation, and presents an automatic return when deactivated. The preferred extended panel 18*d* is flexible so as to enable the load 100 to sink into the base 14 when base extension is not desired, as is normally experienced. It is appreciated that internal base supports, such as springs 30, and/or foam 32 may be used to limit flexure experienced by the extended panel 18*d* (FIG. 2*a*). A full depth cut-out, however, enables the extended panel 18*d* to swing further into the base 14 when the actuator 20, connected thereto, is activated.

Also shown in FIG. 2 is a power adjustment assembly 10 for augmenting actuation when adjusting the upright angle of inclination. More particularly, a second structure 18*b* is concentrically aligned with a pivot axis defined by the base 14 and upright 16, and presents short and extended sections 18*c,d* similar to structure 18*a*. When a resting load 100 acts upon the extended section 18*d*, the second structure 18*b* redirects and transfers the force vector, so as to bias the upright 16 towards a more vertical orientation. More preferably, the structure 18*b* is flexible and therefore, operable to store energy when caused to bend under the resting load 100. It is appreciated that as the upright 16 reclines, as shown in hidden-line type in FIG. 2, energy is increasingly stored in the structure 18*b*. Thus, greater augmentation is provided where greater work is demanded upon the actuator 20.

In this configuration, an SMA wire 20 may be interconnected to the structure 18 and frame 26 preferably near the axis, as shown. The SMA wire 20 is of suitable gauge, stroke, and composition to effect the intended manipulation, as augmented by the minimal anticipated load 100. The wire 20 is preferably connected to the frame 26 at its ends, and medially coupled to the structure 18*b*, so as to form a bow-string configuration. In this configuration, it is appreciated that wire activation results in amplified displacement at the vertex due to the trigonometric relationship presented. As used herein, the term "wire" is non-limiting, and encompasses other equivalent geometric configurations such as bundles, loops, braids, cables, ropes, chains, strips, etc. Moreover, the wire 20 may present a looped configuration, wherein actuation force is doubled but displacement is halved. The wire 20 may be oriented as illustrated, or redirected by wrapping it around one or more pulleys, bent structures, etc., to facilitate packaging.

In the illustrated embodiments, an SMA wire actuator 20 is preferably connected to the structure 18 and frame 26 through reinforcing structural fasteners (e.g., crimps, etc.), which facilitate and isolate mechanical and electrical connection. For tailored force and displacement performance, the actuator 20 may include a plurality of active material elements 14 (e.g., SMA wires) configured electrically or mechanically in series or parallel, and mechanically connected in telescoping, stacked, or staggered configurations. The electrical configuration may be modified during operation by software timing, circuitry timing, and external or actuation induced electrical contact. Finally, to take up slack caused by bending the extended panel 18b, it is appreciated that the wire 20 may be wound about a spring biased spool 34 pivotally coupled to the frame 26. The spool 34 presents one-way action, and is cooperatively configured with the resistance to shifting, so as not to produce motion when not in use.

As shown in FIG. 2, the locking mechanism 28 may include a "toothed" gear 36 fixedly coupled to the structure 18, and concentrically aligned with the axis. A pawl 38 pivotally connected to the frame 26 is operable to selectively engage the gear 36, so as to prevent relative motion between the structure 18 and frame 26 in one direction. A second active material element (e.g., SMA wire) 40 is preferably connected to the pawl 38 and configured to cause selectively disengagement with the structure 18 (FIG. 2). The locking mechanism 28 is configured to retain the structure 18 in the first and/or second configurations, as desired. Finally, a return mechanism (e.g., an extension, compression, torsional spring, or a third active material element, etc.) 42 functions antagonistically to the disengaging element 40, so as to bias the mechanism 28 towards the engaged position. It is preferable to construct the locking mechanism 28 so as to provide passive overload protection; for example, wherein the pawl 38 and/or frame 26 present break-away connection.

Thus, an exemplary mode of operation includes an initial base configuration wherein the torque tube 20, and flexible panel 18d are undeformed, and the locking mechanism (e.g., latch) 28 is engaged. Next, the resting load 100 is applied, so as to deform and store energy within the panel 18d, while the tube 20 and latch 28 remain unchanged. Here, the SMA whether Austenitic or Martensitic stores energy, so as to dampen the system 10. When the latch 28 is released, the energy stored in the panel 18d by the resting load 100 is released and the panel 18d adapts a modified configuration. The rotation/pivoting of the panel 18d causes the tube 20 to deform, and then activation of the tube 20 effects the extended position shown in hidden line type (FIG. 2). Means (e.g., dampers, ratchets, etc.) to regulate the manipulation when the latch 28 is released is preferably provided. Alternatively, the tube 20 may be used to reset the assembly 10, after the load 100 drives the extender outward. Here it is appreciated that where the latch 28 is of a one-way type, the secondary actuator 40 need not be activated to allow reverse rotation; however, where the latch 28 is a two-way latch, it is appreciated that the secondary actuator 40 must be activated.

Figure 3:
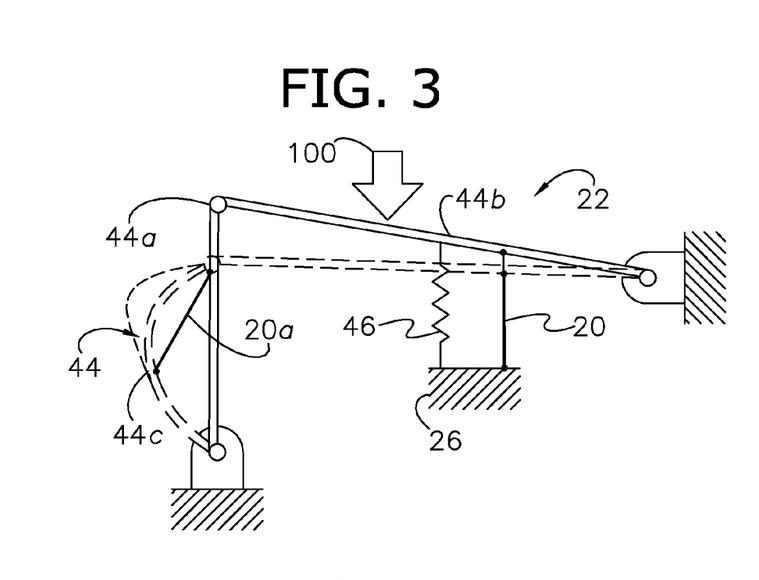
FIG. 3 is a side elevation of a flexible structural member pivotally connected to the base frame and presenting a first raised position (in solid-line type) and an extended position cooperatively caused by the activation of a shape memory wire actuator and a resting load (in hidden-line type), in accordance with a preferred embodiment of the invention.

In another example shown in FIG. 3, the base 14 includes a flexible member 44 presenting a first raised position that defines the first base length, and configured to be bowed by the load 100 and actuator 20 to a second lowered position, so as to define the second base length. Here, it is appreciated that the work done by the actuator 20 is directly augmented by the resting load 100. In this configuration, the base 14 includes a resistively flexible member 44 (e.g., a plastic panel, wire frame, basket or mesh, etc.) that lateral spans the base 14. The member 44 presents a first raised configuration that defines the first length, when a resting load 100 is not reposed on the seat 12. The actuator 20 is drivenly coupled to the member 44 and operable to cause the member 44 to achieve a second position wherein a portion of the member 44 is bowed outward, and positioned so as to be further bowed by the load 100 to a third position that defines the second length. A mechanical overload or system shut-off is preferably provided to prevent "hot" stretching the SMA actuator 20 where the load 100 is removed. Again, damping is preferably provided to prevent sudden extensions; and base supports (e.g., springs 30 or foam 32) are preferably compressed to limit structure bending due to occupant travel in the third position.

More particularly, the flexible member 44 is vertically and horizontally connected to base frame 26, so as to define an "L" shaped structure and a pivotal joint 44a. As shown in FIG. 3, a vertically oriented SMA wire 20 may interconnect the relatively stiffer horizontal component 44b of the member 44 to the base frame 26. In the raised position, the joint 44a is raised so as to present a vertical component 44c of the member 44. When the actuator 20 is activated, the joint 44a is pulled downward, resulting in the bowing of the vertical component 44c. It is appreciated that the resting load 100, when present, causes the joint 44a to further lower and the vertical component 44c to further bow, resulting in the second support length.

A second auxiliary wire 20a is preferably provided, and interconnected from the joint 44a to an intermediate point along the height of the vertical component 44c, so as to form a diagonal chord, when the vertical component 44c is bowed (FIG. 3). When the auxiliary wire 20a is activated, the vertical component 44c is caused to further extend the second support length. Finally, a return mechanism 46, such as a vertically oriented compression spring (also shown in FIG. 3) may be provided to bias the member 44 towards the raised configuration; though it is appreciated that the bowed component 44c provides some spring action.

Figure 3A:
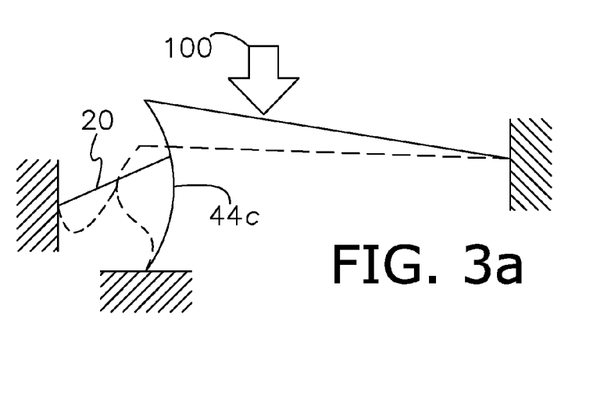
FIG. 3a is a schematic side elevation of a flexible structural member pivotally connected to the base frame and presenting a first raised condition and inwardly bowed vertical component (in solid-line type) and an extended condition and outwardly bowed component cooperatively caused by the activation of a shape memory wire actuator and resting load (in hidden-line type), in accordance with a preferred embodiment of the invention.

Alternatively, the vertical component 44c may present in inwardly bowed profile as shown in FIG. 3a. In this configuration, the resting load 100 stores energy within the vertical component 44c further bowing it, generally fixing its upper end, and transforming it into a bi-stable structure. As a result, actuator demand is augmented by reducing the stroke necessary to effect full deployment. More particularly, where the wire 20 is oriented traversely (e.g., horizontally), it may be briefly activated, so as to selectively effect a momentary actuation force operable to shift the component 44c past its limit point to achieve an outwardly bowed profile. Once past the limit point, it is appreciated that the component 44c snaps to the deployed (shown in hidden line type) configuration; and that retention of the outwardly bowed profile is effected by the load 100. Once deactivated, the actuator 20 regains the slack and/or psuedo-plasticity necessary to allow the component 44c to return to the inward profile when the load 100 is removed. An opposite biasing mechanism or actuator (not shown) may be added to automatically or selectively restore the inwardly bowed profile, when the load 100 is removed.

In yet another base example, an extension assembly 10 is shown in FIGS. 4a,b, including a fixed section 48 of the base, a selectively released free section 50, and in enlarged caption view a detent locking mechanism 28. Here, the actuator (e.g., bow-string SMA wire) 20 is configured to selectively cause the free section 50 to slide outwardly, thereby extending the length of the base 14 (shown in hidden line type). A return mechanism (e.g., extension spring) 46 is coupled to the free section 50 and works opposite the actuator 20, so as to partially define the resistance to shifting. The actuator 20 is augmented by a transmission 22 comprising first and second flexible arcuate members or ribs 52 disposed within the base 14 such that the vertex is facing up (FIGS. 4a,b). The arcuate members 52 are configured to receive at least a portion of the load 100, which acts to flatten the members 52. By flattening the arcuate members 52 an outward force is applied to the free section 50 when the resting load 100 is present. A simple linkage (not shown) may also be used as the transmission instead of the arcuate members 52 described above.

More preferably, first and second compression springs 24 are intermediately disposed between the free section 50 and member 52. The springs 24 store energy and enable the arcuate members 52 to flatten under the resting load 100 when the free section 50 is not free to translate. As shown in FIG. 4a, a detent 32 is preferably employed to retain the free section 50 in a non-extended or stowed configuration. The assembly 10 is configured such that both the load 100 and actuation force are required to overcome the detent 32. A second detent (not shown) along the track is preferably provided to engage the free section 50 in the extended position, and configured to retain the free section 50 therein, under the resting load 100. That is to say, the second detent retains the free section 50 in the extended position when the actuator 20 is deactivated, so long as the resting load 100 continues. It is certainly within the ambit of the invention, for one or both detents to be releasably engaged (e.g., by a second SMA actuator) prior to translating the free section 50 or for a latch to be used similarly, so as to retain a desired setting until manually released. Finally, when the resting load is ceased, the return spring 46 overcomes the second detent, and automatically returns the base 14 to the original configuration.

In another embodiment of the invention, a suitable transmission 22 may be used to augment the actuation of manipulable base or upright bolsters 54 (FIGS. 1, 5, and 6). In FIG. 5, for example, the reconfigurable structure 18 presents arcuate bolster engaging portions 18a, an interior pivot axis, and interconnected actuator and load engaging portions 18b. An SMA wire 20 is connected to the structure 18 near the inner edge and to the frame 26. When activated, the SMA wire 20 contracts causing the distal edge of the structure 18 to rotate upward. The work performed by the wire 20 is augmented by the resting load 100, where the engaging portion 18b is extended towards the centerline of the base 14. Here, it is appreciated that the load 100 and material activation cooperatively work to achieve the final displacement of the structure 18. Again, to enable occupant travel when the bolster 54 is not manipulated, the engaging portion 18b is preferably flexible and limited by internal base supports (e.g., springs 30, foam/cushion 32, etc.). That is to say, the engaging portion 18b may be caused to bend solely under the load 100 as far as the internal base supports allow, thereby storing torque along the pivot axes.

When the structure 18 is released for manipulation, the torque is converted into rotational displacement, and the actuator 20 acts to further pivot the bolsters 54. It is appreciated that mechanical advantage may be provided according to the relative lengths of the bolster and load engaging portions 18a,b. A slot and pin connection 19 at the intersection of the load engaging sections 18b enable the sections 18b to relatively swing and achieve differing overlapping configurations as the bolsters are manipulated. Alternatively, the slot and pin connection 19 may be replaced by a latch preferably defining multiple intermediate stops, so that the engaging sections 18b may be caused to lock in an achieved configuration. Here, it is again appreciated that a secondary actuator may be used to selectively release the latch, such that the resting load 100 and/or primary actuator 20 are able to manipulate the bolsters. Finally, and as shown in FIG. 5, a torsion spring concentrically aligned with the pivot axis and presenting a spring modulus less than the load 100 and/or actuation force may be used to provide an automatic return.

In another bolster example, and as shown in FIG. 6, a set of lateral bolsters 54 may be drivenly coupled by a vertical rack 56, pinion 58, and pivotal linkage, collectively defining the transmission 22, so as to effect simultaneous motion. A middle bar 60 is fixedly connected to and passes through the center of the pinion 58, so as to congruently rotate therewith. First and second exterior bars 62,64 are pivotally coupled at the ends of the middle bar 60 and to the lateral structures 18 at congruent points above their pivot axes. The rack 56 presents a platform 66 at its upper end. The platform 66 concentrates and transfers the resting load 100, and engages a compression return spring 46 buttressed by the seat frame 26 at its lower end to act as a return. At least one shape memory wire 20 is aligned with the spring 46 and interconnects the rack 56 and frame 26. The rack 56 is lowered, and the pinion 58 and therefore the bolsters 54 are caused to rotate, when the wire(s) 20 is activated and/or the resting load 100 is applied to the platform 66. As shown in FIG. 6, the transmission 22 may be configured to effect a more pronounced bolster configuration when the rack 56 is lowered, so as to provide more lateral support during loading and a flatter configuration during ingress/egress. Alternatively, it is appreciated that the pinion 58 may be positioned on the opposite side of the rack 56 from what is shown to effect a flatter bolster configuration proportional to the load 100, so as to provide increased comfort to larger passengers (heavier loads) and increased lateral support to smaller passengers (lighter loads). When the load 100 is removed and the wire 20 deactivated, the compression spring 46 drives the rack 56 and bolsters 54 back to their original configurations. Alternatively, a two-way actuator 20, including a second SMA wire (shown in hidden line type in FIG. 6) may be used to drive the transmission 22 and bolsters 54 back to their original configurations. Lastly, at least one locking mechanism, configured to engage either the rack 56 or pinion 58, is provided to retain the bolsters 54 in the second or deployed position, when the wire(s) 20 is deactivated.

More preferably, the role of the compression spring 46 is to maintain a default configuration which is deemed to be comfortable for a user having a mass within a specified range. The spring 46 has a preload that prevents the bolsters 54 from moving for such users. Once the mass preload corresponding to this threshold is exceeded, and the rack 56 is free to move, the spring 46 begins to deflect (compress) under the action of the load 100. This causes the rack 56 to move down, which causes the gear 58 to rotate clock-wise, which in turn, causes the bolsters 54 to rotate outward (i.e. reduce their prominence) or inward depending upon which side of the rack 56 the gear 58 engages. Again, damping (viscous, frictional, etc) is preferably introduced into the assembly to allow the motion to take place smoothly. A multi-position detent (not shown) comprising multiple holes in a member connected to the rack 56 and at least one biased locking pin (also not shown) is preferably used to secure the position of the platform 66. A (secondary) SMA actuator is activated to overcome the bias and disengage the detent thereby allowing the rack 56 to move. If the mass 100 is removed and the detent is disengaged, the restoring spring 46 will restore the assembly 10 to the default configuration. Lastly, the (primary) actuator 20 may be configured (e.g., include two antagonistic SMA actuators) to work against the external load 100 and/or the return spring 46 to position the platform 66, and hence the bolsters 54.

In a final example shown in FIGS. 7*a,b*, the transmission 22 presents a generally horizontally oriented folding mechanism manipulable between collapsed and extended conditions. The folding mechanism 22 comprises a series of parallel slats 68 that are pivotally connected to a centrally located floating rib 70 and to the structures 18 at their distal ends. Through interconnection, the structures 18 are caused to congruently pivot as a result of shifting the mechanism 22. A preferred actuator 20 in this configuration consists of SMA wires 20 coextending with and supported by each set of pivotally connected slats 68. By flattening each set of slats 68, the wires 20 cause the mechanism 22 to shift when activated. In this configuration, the actuator 20 is augmented by a platform 66 and column 72 orthogonally connected to the floating rib 70 and configured to receive the load 100. That is to say, the load 100 acting directly upon the rib 70 reduces the actuation force necessary.

More preferably, the column 72 presents telescoping parts, and a compression spring 24 disposed intermediate the parts. The spring 24 is configured to store energy from the load 100, so as to allow occupant travel again preferably limited by internal base supports, when the bolsters 54 are not free to shift. When bolster manipulation is desired, the spring 24 augments the actuation force offered by the wires 20. As further shown in FIG. 7*a*, a second spring 46 is preferably positioned beneath the rib 70 and configured to act as a return mechanism. That is to say, the second spring 46 restores the platform 66 and bolsters 54 to their original configurations, when the load 100 is removed and/or the SMA wires 20 are deactivated. Again, in this configuration, the assembly 10 preferably includes a multi-position detent (not shown) and secondary SMA actuator (also not shown) selectively operable to release the detent, so as to provide zero-power hold.

With respect to the upright 16, it is appreciated that the resting load 100 may be similarly used to augment the actuation force necessary to alter the tension within the lumbar supports 74 (FIG. 1). More particularly, a resting load upon the upright 16 may be used to augment an actuator 20 used to snap bi-stable lumbar supports 74 from a bowed inward to a bowed rearward condition, thereby resulting in a less rigid engaging surface that enables the occupant to sink further into the upright 16. This enables the shape memory wires 20 used to drive rearward modification to be downgraded in size and/or rating accordingly. When the resting load is ceased and/or the wires 20 are deactivated, a return mechanism (e.g., spring steel, etc.) 46 may be used to snap the support 74 back to the original or bowed inward condition.

In operation, a signal source 76 is communicatively coupled to the actuator 20 and operable to generate the activation signal, so as to activate the actuator 20. For example, in an automotive setting, the source 76 may consist of the charging system of a vehicle, including the battery (FIG. 1), and the actuator 20 may be interconnected thereto via bus, leads 78, or suitable short-range wireless communication (e.g., RF, bluetooth, infrared, etc.). A button or otherwise input device 80 with an electrical interface to the shape memory alloy actuator 20 is preferably used to close the circuit between the source 76 and actuator 20, so as to provide on-demand control of the assembly 10. It is appreciated that the input device 80 may generate only a request for actuation that is otherwise processed by a gate at the controller 26, which determines whether to grant the request. For example, the gate may determine which input device was manually activated, so as to predict the presence of a resting load within a particular seat. In FIG. 1, the input 80 is located on the side of the base 14.

More preferably, the inventive assembly 10 preferably provides both on-demand (i.e., manual) and autonomous functionality. With respect to the latter, the assembly 10 preferably includes a controller 82 communicatively coupled to the actuator 20, and operable to selectively activate the actuator 20. The preferred controller 82 is able to control, the timing, duration, and extent of activation. In a preferred embodiment, at least one, and more preferably a plurality of in concert sensors 84 are communicatively coupled to the controller 82 and operable to detect a prerequisite condition. The controller 82 and sensor 84 are cooperatively configured to autonomously activate the actuator 20, only when the prerequisite condition exists. For example, so as to avoid overloading a lesser sized and/or rated actuator 20, the controller 82 and sensor 84 may be cooperatively configured to cause activation only when a sufficient resting load 100 is detected in the seat 12.

It is appreciated that suitable algorithms, processing capability, and sensor inputs are well within the skill of those in the art in view of this disclosure. Again, it is also appreciated that alternative configurations and active material selections are encompassed by this disclosure. For instance, SMP may be utilized to release stored energy, where caused to achieve its lower modulus state.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

What is claimed is:

1. A power adjusted seat assembly for use when a resting load is present within the seat, said seat assembly comprising:

a seat base structure extendable and retractable between a first seat base length and a second seat base length wherein:
  the seat base structure includes a base frame and an angled flap pivotally connected to the base frame at a pivot axis defined laterally by the seat base structure;
  the angled flap defines a first panel and a second panel; and
  a rotation of the first panel downward corresponds with an outward rotation of the second panel to extend the seat base to the second seat base length; and
an active material actuator drivenly coupled to the angled flap wherein:
  the angled flap is drivenly coupled to the seat base structure to selectably rotate about the pivot axis in response to at least a portion of the resting load acting upon the first panel; and
  the active material actuator and the angled flap are cooperatively configured to cause the seat base structure to extend between the first seat base length and the second seat base length when the resting load is present and the active material actuator is activated.

2. The assembly as claimed in claim 1, wherein the resting load presents an applied force vector having an applied magnitude and a direction of application to the mechanical transmission, and the angled flap is a lever to amplify the applied magnitude of the applied force vector output an output force vector having an output force magnitude greater than the applied magnitude of the applied force vector.

3. The assembly as claimed in claim 1, wherein the seat base structure presents a resistance to shifting, and the angled flap driven by the resting load and the actuator are cooperatively configured to overcome the resistance to extending and retracting.

4. The assembly as claimed in claim 1, further comprising
  a controller communicatively coupled to the actuator and operable to activate the actuator; and
  a sensor communicatively coupled to the controller and operable to detect the resting load,
  said controller and sensor being cooperatively configured to autonomously activate the actuator, when the resting load is detected.

5. The assembly as claimed in claim 1, further comprising:
  a locking mechanism operable to selectively engage the angled flap when the seat base structure is extended to the second seat base length
  wherein the seat base structure is retractable only when the locking mechanism is disengaged from the angled flap.

6. The assembly as claimed in claim 1, wherein the transmission further includes a stored energy element drivenly coupled to the structure, the stored energy element is operable to release stored energy when the actuator is activated, and the energy and actuator are cooperatively configured to cause the structure to shift between the first and second dimensions, orientations, positions, or conditions.

7. The assembly as claimed in claim 6, wherein the seat further includes internal supports, the stored energy element is defined by a flexible member, and the flexible member is limited by the supports.

8. The assembly as claimed in claim 1, wherein the actuator includes an active material element operable to undergo a reversible change when exposed to or occluded from an activation signal, and the seat base structure is caused or enabled to extend and retract as a result of the reversible change.

9. The assembly as claimed in claim 8, wherein the active material element is comprised of material selected from the group consisting of shape memory alloys, ferromagnetic shape memory alloys, shape memory polymers, electroactive polymers, and piezoelectric composite.

10. The assembly as claimed in claim 9, wherein the active material element is a shape memory alloy wire, ribbon, cable, braid, or tube.

11. A power adjusted seat assembly for use when a resting load is present within the seat assembly, said seat assembly comprising:
  a seat base structure includes a base frame;
  a lever pivotally connected to the base frame at a pivot axis defined laterally by the seat base structure;
  a seat upright structure rotatable between a first upright angle of inclination and a second upright angle of inclination wherein:
    the lever has a first lever arm connected to the seat base structure and a second lever arm connected to the seat upright structure
    a rotation of the first lever arm downward corresponds with an upward rotation of the second lever arm to rotate the seat upright structure to the second upright angle of inclination; and
  an active material actuator drivenly coupled to the lever wherein:
    the lever is drivenly coupled to the seat base structure to selectably rotate about the pivot axis in response to at least a portion of the resting load acting upon the first lever arm; and
    the active material actuator and the lever are cooperatively configured to cause the seat upright structure to rotate between the first upright angle of inclination and the second upright angle of inclination when the resting load is present and the active material actuator is activated.

* * * * *

UNITED STATES PATENT AND TRADEMARK OFFICE
CERTIFICATE OF CORRECTION

PATENT NO. : 8,998,320 B2
APPLICATION NO. : 13/535371
DATED : April 7, 2015
INVENTOR(S) : Mankame et al.

Page 1 of 1

It is certified that error appears in the above-identified patent and that said Letters Patent is hereby corrected as shown below:

In The Claims

Column 17, Claim 2 should read:
--2. The assembly as claimed in claim 1, wherein the resting load presents an applied force vector having an applied magnitude and a direction of application to a mechanical transmission, and the angled flap is a lever to amplify the applied magnitude of the applied force vector to output an output force vector having an output force magnitude greater than the applied magnitude of the applied force vector.--

Columns 17-18, Claim 6 should read:
--6. The assembly as claimed in claim 1, wherein a transmission includes a stored energy element drivenly coupled to the structure, the stored energy element is operable to release stored energy when the actuator is activated, and the energy and actuator are cooperatively configured to cause the structure to shift between the first and second dimensions, orientations, positions, or conditions.--

Signed and Sealed this
Twelfth Day of January, 2016

Michelle K. Lee
*Director of the United States Patent and Trademark Office*